United States Patent
Golz

(10) Patent No.: US 11,325,251 B2
(45) Date of Patent: May 10, 2022

(54) ROBOT

(71) Applicant: FRANKA EMIKA GMBH, Munich (DE)

(72) Inventor: Saskia Golz, Munich (DE)

(73) Assignee: Franka Emika GmbH, Munich (DE)

(*) Notice: Subject to any disclaimer, the term of this patent is extended or adjusted under 35 U.S.C. 154(b) by 277 days.

(21) Appl. No.: 16/480,221

(22) PCT Filed: Feb. 7, 2018

(86) PCT No.: PCT/EP2018/053096
§ 371 (c)(1),
(2) Date: Jul. 23, 2019

(87) PCT Pub. No.: WO2018/146158
PCT Pub. Date: Aug. 16, 2018

(65) Prior Publication Data
US 2020/0001456 A1    Jan. 2, 2020

(30) Foreign Application Priority Data

Feb. 9, 2017 (DE) ............... 10 2017 102 621.5

(51) Int. Cl.
*G05B 15/00* (2006.01)
*G05B 19/00* (2006.01)
(Continued)

(52) U.S. Cl.
CPC .......... *B25J 9/1633* (2013.01); *B25J 9/1674* (2013.01); *B25J 9/1694* (2013.01); *B25J 13/085* (2013.01);
(Continued)

(58) Field of Classification Search
CPC ... A23G 7/02; A23G 9/04; A23G 9/12; A23G 9/44; A23G 9/224; A61K 8/88;
(Continued)

(56) References Cited

U.S. PATENT DOCUMENTS 6,430,473 B1 * 8/2002 Lee ................. B25J 9/162
                                                318/568.16
2004/0128026 A1 7/2004 Harris et al.
(Continued)

FOREIGN PATENT DOCUMENTS

DE    102008062622 B4    8/2016
DE    102015009151 A1    1/2017
(Continued)

OTHER PUBLICATIONS

English translation of the International Preliminary Report on Patentability issued in International Application No. PCT/EP2018/053096 dated Aug. 22, 2019.
(Continued)

*Primary Examiner* — Harry Y Oh
(74) *Attorney, Agent, or Firm* — Hoffmann & Baron, LLP

(57) ABSTRACT

A robot including a manipulator driven by actuators, and configured to determine external forces and/or external torques acting upon the manipulator, the robot configured to: regulate the actuators for a sub-space T1 of a working space AR such that, upon application of an external force and/or external torque upon the manipulator, the manipulator recedes into T1, wherein following applies: T1⊆AR and T1≠AR, and AR specifies all permitted translations and/or rotations of the manipulator; and determine, for a space TK1 that is complementary to T1, a projection $\vec{P}_{TK1}$ of the external force and/or external torque into TK1, wherein following applies: T1∩TK1={0}, TK1⊆AR, and T1∪TK1=AR, classify $\vec{P}_{TK1}$ into one of several predefined classes with respect to amount and/or direction and/or time curve of $\vec{P}_{TK1}$, store a command and/or rule for each predefined class, and regulate the actuators as a function of
(Continued)

classification of $\vec{P}_{TK1}$ based on respective command and/or rule.

20 Claims, 1 Drawing Sheet

(51) Int. Cl.
    *B25J 9/16*       (2006.01)
    *B25J 13/08*     (2006.01)
    *B25J 19/02*     (2006.01)
    *G05B 19/02*    (2006.01)

(52) U.S. Cl.
    CPC .............. *B25J 19/02* (2013.01); *G05B 19/02* (2013.01); *G05B 2219/39319* (2013.01); *G05B 2219/39346* (2013.01)

(58) Field of Classification Search
CPC ..... A61K 2800/10; A61K 8/042; A61L 27/18; A61L 27/52; A61Q 19/00; A61Q 19/08; B08B 15/04; B08B 5/04; B24B 55/102; C08G 69/10; C08G 69/48; B60W 10/06; B60W 10/18; B60W 2510/244; B60W 2520/00; B60W 2554/80; B60W 30/02; B60W 30/143; B60W 30/16; B60W 20/13; B60W 2520/10; B60W 2540/10; B60W 2540/12; B60W 2552/15; B60W 2554/802; B60W 30/18018; B60W 30/18127; B60W 30/182; B60W 40/076; B60W 40/105; B33Y 70/00; C08J 2477/04; C08J 3/075; C08J 3/24; C08J 3/28; C08J 2377/04; B25J 13/085; B25J 19/02; B25J 9/1628; B25J 9/1633; B25J 9/1674; B25J 9/1694; C08L 77/04; F02D 41/042; F02N 11/04; F02N 11/0829; F02N 2200/061; F02N 2200/0801; F02N 11/0825; F02N 11/0837; F02N 2200/125; G05B 19/02; G05B 2219/39319; G05B 2219/39346; A21C 1/1495; F28D 7/024; Y02T 10/70; F25B 39/02; C07K 2/00; B60Y 2200/92; B60Y 2300/16; B60Y 2300/18016; B60Y 2300/182; B60L 58/12
See application file for complete search history.

(56) References Cited

U.S. PATENT DOCUMENTS

| | | | |
|---|---|---|---|
| 2010/0270271 A1* | 10/2010 | Jacob | B23K 11/31 219/86.25 |
| 2011/0029133 A1* | 2/2011 | Okazaki | B25J 19/0004 700/258 |
| 2014/0277725 A1* | 9/2014 | Kouno | G05B 19/4061 700/255 |
| 2016/0243700 A1* | 8/2016 | Naitou | B25J 9/1633 |
| 2018/0200880 A1* | 7/2018 | Meissner | B25J 9/0081 |

FOREIGN PATENT DOCUMENTS

| | | |
|---|---|---|
| JP | 05-305591 A | 11/1993 |
| JP | 2001-38664 A | 2/2001 |
| JP | 2010-253676 A | 11/2010 |
| WO | WO2018/146158 A2 | 8/2018 |

OTHER PUBLICATIONS

English-language summary of Notice of Reasons for Rejection issued in Japanese Application No. JP 2019-542692 dated Oct. 6, 2020.
Search Report and Written Opinion issued in Singapore Application No. 11201907005X dated Jun. 5, 2020.

\* cited by examiner

ROBOT

CROSS-REFERENCE TO RELATED APPLICATIONS

This application is the U.S. National Phase of International Patent Application No. PCT/EP2018/053096, filed on 7 Feb. 2018, which claims benefit of German Patent Application No. 10 2017 102 621.5, filed on 9 Feb. 2017, the contents of which are incorporated herein by reference in their entirety.

BACKGROUND

Field

The invention relates to a robot, having a moving manipulator driven by actuators as well as a unit for determining external forces and/or external torques acting upon the manipulator, wherein the control or regulation of the actuators takes place as a function of the determined external forces and/or external torques acting upon the manipulator. The invention further relates to a method for operating such a robot, as well as a computer system, a digital storage medium, a computer program product, and a computer program.

Related Art

Today, robots with movable parts (e.g., one or more robot manipulators) are increasingly used in areas where the robots complete tasks interacting with humans. It is thus necessary to design the robots such that their movable parts, e.g., manipulators, provide high functional safety.

SUMMARY

The object of the invention is to improve and/or to expand the functionality of a manipulator of a previously described robot.

The invention results from the features of the main claims Advantageous further embodiments and designs are the subject matter of the dependent claims. Further features, application options, and advantages of the invention result from the following description, and explanation of exemplary embodiments of the invention, which are represented in the figures.

A first aspect of the invention relates to a robot including a manipulator driven by actuators, a first unit designed and configured to determine external forces and/or external torques acting upon the manipulator, and a second unit designed and configured to control or regulate the actuators as a function of the determined external forces and/or external torques acting upon the manipulator. Herein, performance of functionality by the first and second units of the robot characterize and are understood as performance of the functionality by the robot itself. According to the invention, the second unit is further designed and configured to control/to regulate the actuators for a predefined sub-space T1 of a working space AR of the manipulator such that, upon application of a determined external force and/or a determined external torque upon the manipulator, the manipulator recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator.

Furthermore according to the invention, the second unit is designed and configured to determine, for a sub-space TK1 complementary to the sub-space T1, a projection $\vec{P}_{TK1}$ of the determined external force and/or the determined external torque into the complementary space TK1, wherein the following applies: T1∩TK1={0}, TK1⊆AR, and T1∪TK1=AR, classify the projection $\vec{P}_{TK1}$ into one of several predefined classes with respect to amount and/or direction and/or time curve of the projection $\vec{P}_{TK1}$, store at least one discrete and/or continuous control command and/or control rule for each predefined class, and to control/to regulate the actuators as a function of classification of the projection $\vec{P}_{TK1}$, such that the manipulator reverts from the sub-space T1 and extends into complementary sub-space TK1, based on the respective discrete or continuous control command and/or control rule.

The proposed robot thus enables the defining of a sub-space T1 of a working space AR of the manipulator, wherein the actuators of the manipulator and thus the manipulator itself are controlled and/or regulated such that the manipulator recedes flexibly into the sub-space T1 along a projection $\vec{P}_{T1}$ of the force and/or the torque upon the application of external forces and/or torques acting upon the manipulator. The receding can be translational and/or rotational.

The sub-space T1 may be defined, for example, one-dimensionally as a direction or two-dimensionally as a plane. For example, if the sub-space T1 is defined as a direction and there is an application of force onto the manipulator precisely along this direction, the manipulator flexibly recedes translationally along this specific direction.

The term "flexible receding" here advantageously implies that the manipulator is capable of returning to a pose from which it was moved by the receding as a result of the externally applied force and/or torque onto the manipulator. Of course, limits are set on the flexible receding by the working space AR of the manipulator such that this function can only be executed within the working space. The manipulator is capable of achieving the flexible receding by receding along the projection $\vec{P}_{T1}$ into the sub-space T1, reverting from the sub-space T1 and extending into the complementary sub-space TK1 as a function of classification of the projection $\vec{P}_{TK1}$, based on the control command and/or control rule.

Advantageously, the second unit is designed and configured such that the actuators are controlled/regulated such that the point of application of the force and/or of the torque on the manipulator recedes flexibly along the projection $\vec{P}_{T1}$. In order to enable this, it may be necessary for individual links of the manipulator to be moved in a direction other than along the projection $\vec{P}_{T1}$.

Furthermore, the second unit is advantageously designed and configured such that the actuators are controlled/regulated such that the receding along the projection $\vec{P}_{T1}$ only takes place if an absolute value $|\vec{P}_{T1}|$ of the projection $\vec{P}_{T1}$ is greater than a predefined limit value G1. Advantageously, the flexibility of the receding of the manipulator is regulated along the projection $\vec{P}_{T1}$ as a function of the absolute value $|\vec{P}_{T1}|$.

Furthermore, the second unit is advantageously designed and configured such that the receding along the projection $\vec{P}_{T1}$ takes place by an impedance-controlled actuation of the actuators.

Moreover, this enables the proposed robot to determine according to the invention, for a sub-space TK1 complementary to the sub-space T1, a projection $\vec{P}_{TK1}$ of the determined external force and/or the determined external torque into the complementary sub-space TK1, wherein the following applies: T1∩TK1={0}, TK1⊆AR, and T1∪TK1=AR. The projection $\vec{P}_{TK1}$ into the complementary space TK1 is to be classified into one of several predefined classes with respect to amount and/or direction and/or time curve of the projection $\vec{P}_{TK1}$. To this end, at least one discrete and/or continuous control command and/or control rule is stored for each predefined class. The actuators are controlled/regulated as a function of classification of the projection $\vec{P}_{TK1}$, such that the manipulator reverts from the sub-space T1 and extends into the complementary sub-space TK1, based on the respective discrete and/or continuous control command and/or control rule.

The term "control command" here is understood to be broadly formulated. Due to such a discrete control command, a program code controlling the robot and/or the actuators, for example, is advantageously modified and/or a mechanical and/or electrical and/or sensory state change (jump/transition) of the manipulator is triggered. Advantageously, one or more interfaces (electrical, digital, audio, video, etc.) and/or assemblies and/or units of the robot are actuated correspondingly by the discrete control command. Discrete control commands may be executed with a time delay, repetition, etc., particularly depending on specifications. Advantageously, a device connected to the robot (second robot, second manipulator, etc.) is controlled by a discrete control command.

A discrete control command can essentially be interpreted as a command that triggers an assigned action. In doing so, the projection $\vec{P}_{TK1}$ corresponds to a signal, which is classified into one of several predefined classes, wherein, according to classification of the signal, the action stored in this class is triggered.

The terms "continuous control command" and "control rule" here indicate specifications regarding the direct control/regulation of the actuators of the manipulator, which are advantageously executed after they have been triggered according to the classification of the projection $\vec{P}_{TK1}$.

Advantageously, the first unit has sensors, and/or monitors, and/or estimators for determining external forces acting upon the manipulator. Advantageously, the actuators themselves are formed as sensors. Advantageously, the manipulator has force and/or torque sensors.

Herein, the term "monitor" characterizes a system of the robot that reconstructs unmeasurable variables (states) from known input variables (for example, correcting variables or measurable disturbance variables) and output variables (measurement variables) of a monitored manipulator reference system. To this end, the monitor simulates the monitored manipulator reference system as a model and tracks the measurable, and therefore comparable with the reference system, state variables with a controller.

Herein, the term "estimator" characterizes a system of the robot that estimates the external forces and torques acting upon the manipulator based on a manipulator model, statistics, and monitored measurement variables.

The proposed robot enables an advantageous expansion of the functionality of actuators driven by manipulators related to the robot.

A further aspect of the invention relates to a method of operating a robot, wherein the robot includes a manipulator driven by actuators, and a first unit designed and configured to determine external forces and/or external torques acting upon the manipulator.

The proposed method includes controlling or regulating the actuators as a function of the determined external forces and/or external torques acting upon the manipulator. More specifically, the method includes regulating or controlling the actuators such that, upon the application of a determined external force and/or a determined external torque onto the manipulator, the manipulator recedes along a projection $\vec{P}_{T1}$ of the determined external force and/or the determined external torque into the sub-space T1, wherein the following applies: T1⊆AR and T1≠AR, and the working space AR specifies the permitted translations and/or rotations of the manipulator, and, determining for a space TK1 that is complementary to the sub-space T1, a projection $\vec{P}_{TK1}$ of the determined external force and/or the determined external torque into the complementary space TK1, wherein the following applies: T1∩TK1={0}, TK1⊆AR, and T1∪TK1=AR, classifying the projection $\vec{P}_{TK1}$ into one of several predefined classes with respect to amount and/or direction and/or time curve of the projection $\vec{P}_{TK1}$, storing at least one discrete and/or continuous control command and/or control rule for each predefined class, and controlling or regulating the actuators as a function of classification of the projection $\vec{P}_{TK1}$, such that the manipulator reverts from the sub-space T1 and extends into the complementary sub-space TK1, based on the respective discrete or continuous control command and/or control rule.

An advantageous further embodiment of the proposed method is characterized in that the actuators are controlled/regulated such that the point of application of the force and/or of the torque on the manipulator recedes along the projection $\vec{P}_{T1}$.

An advantageous further embodiment of the proposed method is characterized in that the determination of the external forces and/or the external torques acting upon the manipulator takes place by sensors and/or monitors and/or estimators.

An advantageous further embodiment of the proposed method is characterized in that the actuators are controlled/regulated such that the receding along the projection $\vec{P}_{T1}$ only takes place if the an absolute value $|\vec{P}_{T1}|$ of the projection $\vec{P}_{T1}$ is greater than a predefined limit value G1.

An advantageous further embodiment of the proposed method is characterized in that the actuators are controlled/regulated such that the receding takes place along the projection $\vec{P}_{T1}$ in an impedance-controlled manner.

Advantages and further embodiments of the proposed method result from an analogous and corresponding transfer of the statements previously made regarding the proposed robot.

A further aspect of the invention relates to a computer system with a data processing device, wherein the data processing device is designed such that a previously stated method is executed on the data processing device.

A further aspect of the invention relates to a digital storage medium with electronically readable control signals, wherein the control signals can interact with a programmable computer system such that a previously described method is executed.

A further aspect of the invention relates to a computer program product with a memory code, stored on a machine-readable carrier, for executing the previously stated method when the program code is implemented on a data processing device.

A further aspect of the invention relates to a computer program with memory codes for executing the previously stated method when the program is running on a data processing device. To this end, the data processing device may be designed as any computer system known from the prior art.

Other advantages, features, and details result from the following description, in which at least one exemplary embodiment is described in detail optionally with reference to the drawing. Equivalent, similar, and/or functionally equivalent parts have been given the same reference numerals.

DETAILED DESCRIPTION

Figure 1:
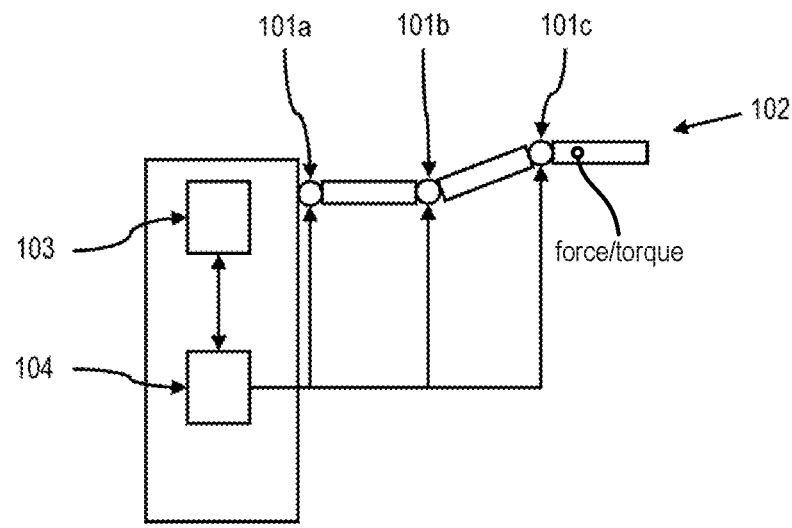
FIG. 1 illustrates a schematic configuration of a robot according to the invention.

FIG. 1 shows a schematic configuration of a robot according to the invention. The robot has: a robot manipulator 102 driven by actuators 101$a$-101$c$, a first unit 103 for determining external forces and/or external torques acting upon the manipulator 102, and a second unit 104 for controlling or regulating the actuators 101$a$-101$c$ as a function of the determined external forces and/or external torques acting upon the manipulator 102. For example, as shown in FIG. 1, an external force and/or an external torque applied at an example point on the robot manipulator 102 can be determined as the external force and/or external torque acting upon the manipulator 102.

Figure 2:
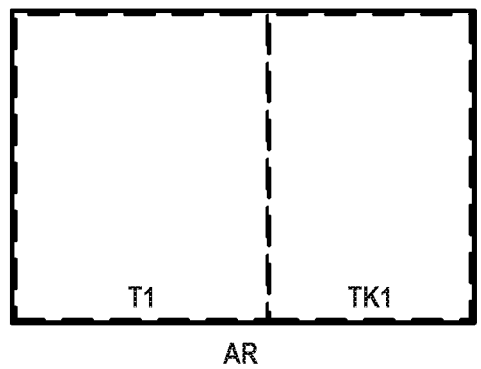
FIG. 2 illustrates an example working space and several example sub-spaces of the working space that are complementary, associated with the robot of FIG. 1.

FIG. 2 illustrates an example working space AR and several example complementary sub-spaces T1 and TK1 of the working space AR, associated with the robot of FIG. 1. The working space AR specifies all permitted translations and/or rotations of the robot manipulator 102. As shown in FIG. 2, T1 is a predefined sub-space of the working space AR and thus includes certain of the translations and/or rotations of the manipulator 102. As further shown in FIG. 2, TK1 is similarly a predefined sub-space of AR and is further complementary to sub-space T1, and thus includes certain other of the translations and/or rotations of working space AR, wherein elements of the sub-spaces do not overlap and make up the working space AR. Sub-spaces T1 and TK1 are defined in view of the working space AR by the following: T1⊆AR and T1≠AR, T1∩TK1={0}, TK1⊆AR, and T1∪TK1=AR.

Figure 3:
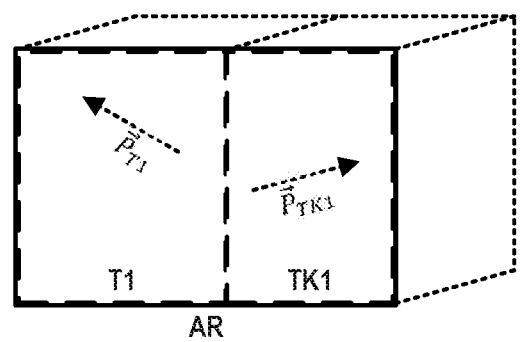
FIG. 3 illustrates several example projections into the respective sub-spaces of FIG. 2.

FIG. 3 illustrates several example projections $\vec{P}_{T1}$ and $\vec{P}_{TK1}$ of the determined external force and/or determined external torque into the respective sub-spaces T1 and TK1 of FIG. 2. In particular, the actuators 101$a$-101$c$ of the robot manipulator 102 are controlled or regulated such that, upon application of a determined external force and/or torque upon the robot manipulator 102, the robot manipulator 102 recedes along projection $\vec{P}_{T1}$ into sub-space T1, then reverts from sub-space T1 and extends into complementary sub-space TK1, as a function of a classification of the projection $\vec{P}_{TK1}$ into the complementary sub-space TK1, based on a control command or a control rule.

In view of FIGS. 1-3, the second unit 104 is designed and configured to control/regulate the actuators 101$a$-101$c$ for the predefined sub-space T1 of the working space AR of the manipulator 102 such that, upon application of a determined external force and/or a determined external torque onto the manipulator, the manipulator 102 recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator 102, and to determine, for a sub-space TK1 that is complementary to the sub-space T1, a projection $\vec{P}_{TK1}$ of the determined external force and/or the determined external torque into the complementary space TK1, wherein the following applies: T1∩TK1={0}, TK1⊆AR, and T1∪TK1=AR, classify the projection $\vec{P}_{TK1}$ into one of several predefined classes with respect to amount and/or direction and/or time curve of the projection $\vec{P}_{TK1}$, store at least one discrete and/or continuous control command and/or control rule for each predefined class, and control/regulate the actuators 101$a$-101$c$ as a function of classification of the projection $\vec{P}_{TK1}$, such that the manipulator 102 reverts from the sub-space T1 and extends into complementary sub-space TK1, based on the respective discrete or continuous control command and/or control rule.

The manipulator 102 is capable of achieving flexible receding by receding along the projection $\vec{P}_{T1}$ into the sub-space T1, reverting from the sub-space T1 and extending into the complementary sub-space TK1 as a function of classification of the projection $\vec{P}_{TK1}$, based on the control command and/or control rule. Accordingly, the manipulator 102 is capable of returning to a pose from which it was moved as a result of the externally applied force and/or externally applied torque on the manipulator 102.

Although the invention has been illustrated and explained in more detail by preferred example embodiments, the invention is not limited by the disclosed examples and other variations may be derived by one of ordinary skill in the art without extending beyond the protective scope of the invention. It is thus clear that a plurality of variation options exists. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMERALS

101a-101c Actuators
102 Manipulator
103 First unit
104 Second unit

The invention claimed is:

1. A robot comprising a manipulator driven by actuators; and the robot being configured to determine external forces and/or external torques acting upon the manipulator, wherein the robot is further configured to:

control or regulate the actuators for a predefined sub-space T1 of a working space AR of the manipulator such that, upon application of a determined external force and/or a determined external torque upon the manipulator, the manipulator recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator; and determine, for a sub-space TK1 that is complementary to the sub-space T1, a projection $\vec{P}_{TK1}$ of the determined external force and/or the determined external torque into the complementary space TK1, wherein the following applies: T1∩TK1={0}, TK1⊆AR, and T1∪TK1=AR, classify the projection $\vec{P}_{TK1}$ into one of several predefined classes with respect to amount and/or direction and/or time curve of the projection $\vec{P}_{TK1}$, store at least one discrete and/or continuous control command and/or control rule for each predefined class, and control or regulate the actuators as a function of classification of the projection $\vec{P}_{TK1}$, such that the manipulator reverts from the sub-space T1 and extends into complementary sub-space TK1, based on the respective discrete or continuous control command and/or control rule.

2. The robot according to claim 1, wherein the robot comprises sensors and/or monitors and/or estimators to determine the external forces and/or torques acting upon the manipulator.

3. The robot according to claim 1, wherein the robot controls or regulates the actuators such that a point of application of the force and/or the torque on the manipulator recedes along the projection $\vec{P}_{T1}$.

4. The robot according to claim 1, wherein the robot controls or regulates the actuators such that the receding along the projection $\vec{P}_{T1}$ only takes place when an absolute value $|\vec{P}_{T1}|$ of the projection $\vec{P}_{T1}$ is greater than a predefined limit value G1.

5. The robot according to claim 1, wherein the robot controls or regulates the actuators such that the receding along the projection $\vec{P}_{T1}$ takes place in an impedance-controlled manner.

6. A method of operating a robot, the robot comprising a manipulator driven by actuators, and the robot being configured to determine external forces and/or external torques acting upon the manipulator, wherein the method comprises:

controlling or regulating the actuators for a predefined sub-space T1 of a working space AR of the manipulator such that, upon application of a determined external force and/or a determined external torque upon the manipulator, the manipulator recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator; and determining for a sub-space TK1 that is complementary to the sub-space T1, a projection $\vec{P}_{TK1}$ of the determined external force and/or the determined external torque into the complementary space TK1, wherein the following applies: T1∩TK1={0}, TK1⊆AR, and T1∪TK1=AR, classifying the projection $\vec{P}_{TK1}$ into one of several predefined classes with respect to amount and/or direction and/or time curve of the projection $\vec{P}_{TK1}$, storing at least one discrete and/or continuous control command and/or control rule for each predefined class, and controlling or regulating the actuators as a function of classification of the projection $\vec{P}_{TK1}$, such that the manipulator reverts from the sub-space T1 and extends into the complementary sub-space TK1, based on the respective discrete or continuous control command and/or control rule.

7. The method according to claim 6, wherein the actuators are controlled or regulated such that a point of application of the force and/or the torque on the manipulator recedes along the projection $\vec{P}_{T1}$.

8. The method according to claim 6, wherein the external forces and/or the external torques acting upon the manipulator are determined by sensors and/or monitors and/or estimators.

9. The method according to claim 6, wherein the actuators are controlled or regulated such that the receding along the projection $\vec{P}_{T1}$ only takes place when an absolute value $|\vec{P}_{T1}|$ of the projection $\vec{P}_{T1}$ is greater than a predefined limit value G1.

10. The method according to claim 6, wherein the actuators are controlled or regulated such that the receding along the projection $\vec{P}_{T1}$ takes place in an impedance-controlled manner.

11. A system to operate a robot, the robot comprising a manipulator driven by actuators, and the robot being configured to determine external forces and/or external torques acting upon the manipulator, wherein the system comprises:

a data processing device; and a memory storing instructions that, when executed by the data processing device, cause the data processing device to perform operations comprising:

controlling or regulating the actuators for a predefined sub-space T1 of a working space AR of the manipulator such that, upon application of a determined external force and/or a determined external torque upon the manipulator, the manipulator recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator; and determining for a space TK1 that is complementary to the sub-space T1, a projection $\vec{P}_{TK1}$ of the determined external force and/or of the determined external torque into the complementary space TK1, wherein the following applies: T1∩TK1={0}, TK1⊆AR, and T1∪TK1=AR, classifying the projection $\vec{P}_{TK1}$ into one of several predefined classes with respect to amount and/or direction and/or time curve of the projection $\vec{P}_{TK1}$, storing at least one discrete and/or continuous control command and/or control rule for each predefined class, and controlling or regulating the actuators as a function of the classification of the projection $\vec{P}_{TK1}$, such that the manipulator reverts from the sub-space T1 and extends into the complementary sub-space TK1, based on the respective discrete or continuous control command and/or control rule.

12. The system according to claim 11, wherein the actuators are controlled or regulated such that a point of application of the force and/or the torque on the manipulator recedes along the projection $\vec{P}_{T1}$.

13. The system according to claim 11, wherein the robot comprises sensors and/or monitors and/or estimators to determine the external forces and/or torques acting upon the manipulator.

14. The system according to claim 11, wherein the actuators are controlled or regulated such that the receding along the projection $\vec{P}_{T1}$ only takes place when an absolute value $|\vec{P}_{T1}|$ of the projection $\vec{P}_{T1}$ is greater than a predefined limit value G1.

15. The system according to claim 11, wherein the actuators are controlled or regulated such that the receding along the projection $\vec{P}_{T1}$ takes place in an impedance-controlled manner.

16. A non-transitory storage medium storing instructions to operate a robot, the robot comprising a manipulator driven by actuators, and the robot being configured to determine external forces and/or external torques acting upon the manipulator, wherein the instructions when executed by a data processing device cause the data processing device to perform operations comprising:

controlling or regulating the actuators for a predefined sub-space T1 of a working space AR of the manipulator such that, upon application of a determined external force and/or a determined external torque upon the manipulator, the manipulator recedes along a projection $\vec{P}_{T1}$ of the determined external force and/or the determined external torque into the sub-space T1, wherein the following applies: T1⊆AR and T1≠AR, and the working space AR specifies all permitted translations and/or rotations of the manipulator; and determining for a space TK1 complementary to the sub-space T1, a projection $\vec{P}_{TK1}$ of the determined external force and/or of the determined external torque into the complementary space TK1, wherein the following applies: T1∩TK1={0}, TK1⊆AR, and T1∪TK1=AR, classifying the projection $\vec{P}_{TK1}$ into one of several predefined classes with respect to amount and/or direction and/or time curve of the projection $\vec{P}_{TK1}$, storing at least one discrete and/or continuous control command and/or control rule for each predefined class, and controlling or regulating the actuators as a function of the classification of the projection $\vec{P}_{TK1}$, such that the manipulator reverts from the sub-space T1 and extends into the complementary sub-space TK1, based on the respective discrete or continuous control command and/or control rule.

17. The non-transitory storage medium according to claim 16, wherein the actuators are controlled or regulated such that a point of application of the force and/or the torque on the manipulator recedes along the projection $\vec{P}_{T1}$.

18. The non-transitory storage according to claim 16, wherein the robot comprises sensors and/or monitors and/or estimators to determine the external forces and/or torques acting upon the manipulator.

19. The non-transitory storage according to claim 16, wherein the actuators are controlled or regulated such that the receding along the projection $\vec{P}_{T1}$ only takes place when an absolute value $|\vec{P}_{T1}|$ of the projection $\vec{P}_{T1}$ is greater than a predefined limit value G1.

20. The non-transitory storage according to claim 16, wherein the actuators are controlled or regulated such that the receding along the projection $\vec{P}_{T1}$ takes place in an impedance-controlled manner.

* * * * *

UNITED STATES PATENT AND TRADEMARK OFFICE
CERTIFICATE OF CORRECTION

PATENT NO. : 11,325,251 B2
APPLICATION NO. : 16/480221
DATED : May 10, 2022
INVENTOR(S) : Saskia Golz Page 1 of 1

It is certified that error appears in the above-identified patent and that said Letters Patent is hereby corrected as shown below:

In the Specification

Column 4, Line 51:
Now reads: "if the an"
Should read: -- if an --

In the Claims

Claim 18, Column 10, Line 28:
Now reads: "The non-transitory storage according"
Should read: -- The non-transitory storage medium according --

Claim 19, Column 10, Line 32:
Now reads: "The non-transitory storage according"
Should read: -- The non-transitory storage medium according --

Claim 20, Column 10, Line 38:
Now reads: "The non-transitory storage according"
Should read: -- The non-transitory storage medium according --

Signed and Sealed this
Sixth Day of December, 2022

Katherine Kelly Vidal
*Director of the United States Patent and Trademark Office*